(12) United States Patent
Unger et al.

(10) Patent No.: US 10,474,635 B1
(45) Date of Patent: Nov. 12, 2019

(54) DYNAMIC EVALUATION AND SELECTION OF FILE SYSTEM PRE-FETCH POLICY

(71) Applicant: Qumulo, Inc., Seattle, WA (US)

(72) Inventors: Thomas R. Unger, Seattle, WA (US); Eric E. Youngblut, Seattle, WA (US); Thomas Gregory Rothschilds, Seattle, WA (US); Jeremy Drouillard, Bellevue, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/231,354

(22) Filed: Dec. 21, 2018

(51) Int. Cl.
*G06F 17/30* (2006.01)
*G06F 16/172* (2019.01)
*G06N 20/00* (2019.01)
*G06F 16/182* (2019.01)

(52) U.S. Cl.
CPC .......... *G06F 16/172* (2019.01); *G06F 16/183* (2019.01); *G06N 20/00* (2019.01)

(58) Field of Classification Search
CPC ..... G06F 16/122; G06F 16/172; G06F 16/183
See application file for complete search history.

(56) References Cited

U.S. PATENT DOCUMENTS

| | | | |
|---|---|---|---|
| 6,385,641 B1 * | 5/2002 | Jiang | H04L 29/06 709/203 |
| 6,772,735 B2 | 8/2004 | Thexton et al. | |
| 8,108,429 B2 | 1/2012 | Sim-Tang et al. | |
| 8,448,170 B2 | 5/2013 | Wipfel et al. | |
| 8,463,825 B1 * | 6/2013 | Harty | G06F 16/188 707/813 |
| 8,612,488 B1 | 12/2013 | Subramanya et al. | |
| 8,838,887 B1 * | 9/2014 | Burke | G06F 3/0611 711/112 |
| 8,838,931 B1 * | 9/2014 | Marshak | G06F 3/0605 711/170 |
| 8,868,797 B1 * | 10/2014 | Kirac | G06F 3/061 710/15 |

(Continued)

OTHER PUBLICATIONS

Office Communication for U.S. Appl. No. 15/967,499 dated Jun. 27, 2018, pp. 1-15.

(Continued)

*Primary Examiner* — Syed H Hasan
(74) *Attorney, Agent, or Firm* — John W. Branch; Lowe Graham Jones PLLC

(57) ABSTRACT

Embodiments are directed to managing data in a file system. An engine may receive read requests associated with a file system that includes pre-fetch storage and file storage. The engine may employ a pre-fetch policy selected from a plurality of pre-fetch policies to copy blocks to pre-fetch storage. The engine may evaluate the selected pre-fetch policy and also evaluate simulated performances for each unselected pre-fetch policy based on subsequent read requests. The engine may provide a performance score based on the evaluation of the selected pre-fetch policy and it may provide other performance scores based on the simulated evaluation of each unselected pre-fetch policy If one of the other performance scores for one of the unselected pre-fetch policies exceeds the performance score of the selected pre-fetch policy, the engine may select that unselected pre-fetch policies as a new selected pre-fetch policy.

30 Claims, 11 Drawing Sheets

(56) References Cited

U.S. PATENT DOCUMENTS

| | | | |
|---|---|---|---|
| 8,972,694 B1* | 3/2015 | Dolan | G06F 13/28 |
| | | | 711/170 |
| 9,026,765 B1* | 5/2015 | Marshak | G06F 3/061 |
| | | | 711/114 |
| 9,047,017 B1* | 6/2015 | Dolan | G06F 3/0653 |
| 9,158,653 B2 | 10/2015 | Gold | |
| 9,171,145 B2 | 10/2015 | Dash et al. | |
| 9,501,487 B1 | 11/2016 | Yuan et al. | |
| 2003/0182313 A1 | 9/2003 | Federwisch et al. | |
| 2005/0091663 A1* | 4/2005 | Bagsby | H04L 69/32 |
| | | | 719/315 |
| 2008/0059541 A1 | 3/2008 | Fachan et al. | |
| 2008/0228772 A1* | 9/2008 | Plamondon | G06F 16/9574 |
| 2010/0179959 A1 | 7/2010 | Shoens | |
| 2012/0204060 A1 | 8/2012 | Swift et al. | |
| 2013/0318194 A1* | 11/2013 | Timbs | G06F 16/252 |
| | | | 709/213 |
| 2014/0006354 A1* | 1/2014 | Parkison | G06F 3/0611 |
| | | | 707/649 |
| 2014/0040199 A1 | 2/2014 | Golab et al. | |
| 2014/0258609 A1* | 9/2014 | Cui | G06F 3/061 |
| | | | 711/113 |
| 2014/0281307 A1 | 9/2014 | Peterson et al. | |
| 2014/0344222 A1 | 11/2014 | Morris et al. | |
| 2016/0034356 A1 | 2/2016 | Aron et al. | |
| 2016/0335278 A1 | 11/2016 | Tabaaloute et al. | |
| 2016/0357677 A1* | 12/2016 | Hooker | G06F 9/30047 |
| 2017/0163728 A1 | 6/2017 | Chawla et al. | |
| 2017/0206231 A1 | 7/2017 | Binder et al. | |
| 2017/0316321 A1* | 11/2017 | Whitney | H04L 67/2847 |

OTHER PUBLICATIONS

Office Communication for U.S. Appl. No. 16/226,587 dated Feb. 25, 2019, pp. 1-46.

Office Communication for U.S. Appl. No. 16/262,756 dated Apr. 2, 2019, pp. 1-29.

* cited by examiner

US 10,474,635 B1

DYNAMIC EVALUATION AND SELECTION OF FILE SYSTEM PRE-FETCH POLICY

TECHNICAL FIELD

The present invention relates generally to file systems, and more particularly, but not exclusively, to managing pre-fetching in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Conventionally, some distributed file systems implement various pre-fetching schemes to help improve read performance. However, implementing a pre-fetch policy that consistently or predictably improves read performance may be difficult because of the variability of client read patterns. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE VARIOUS EMBODIMENTS

Figure 1:
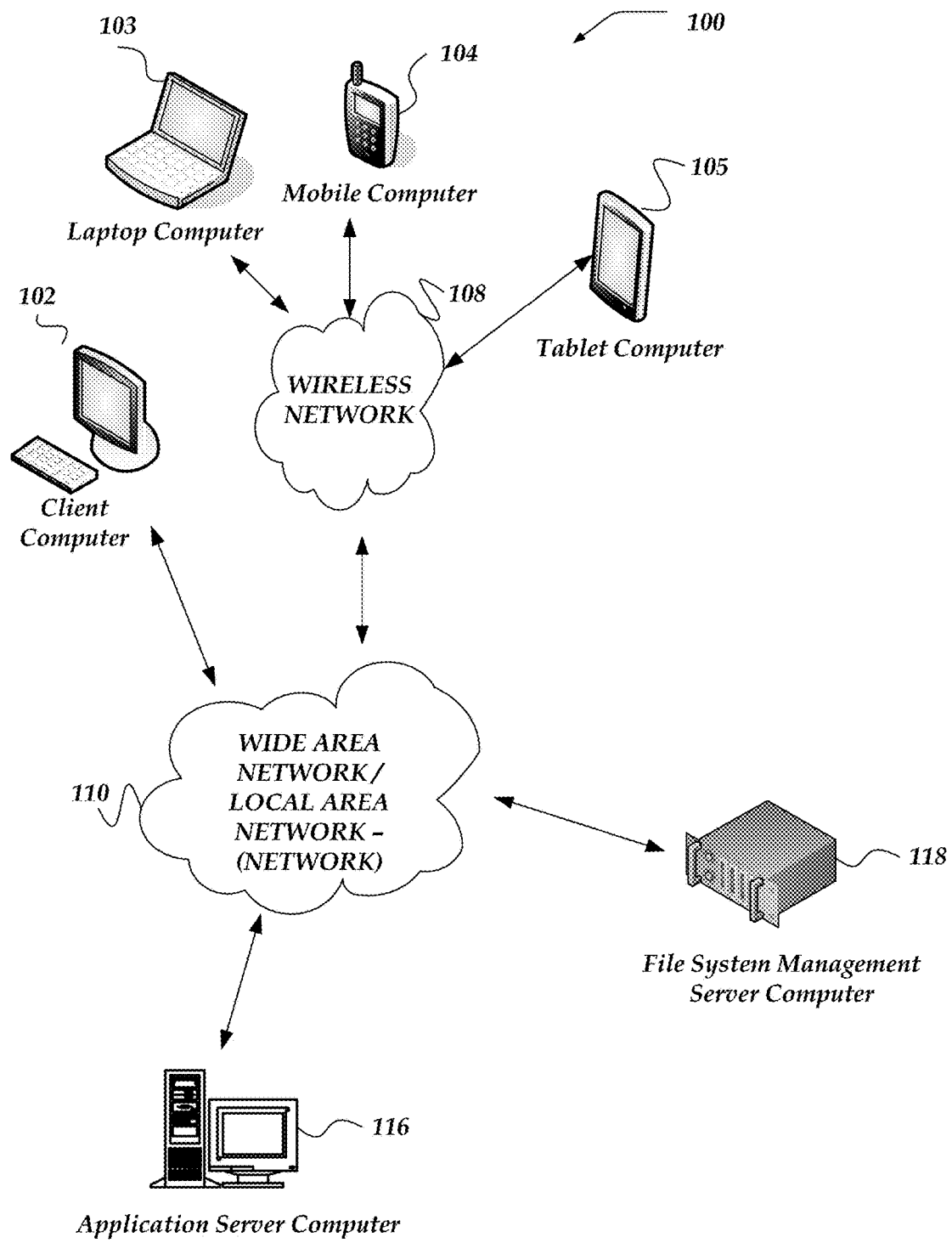
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to discrete sized units of data that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects may be of various sizes, comprised of the number of blocks necessary to represent or contain the entire file system object. Further, blocks may be considered or referred to as file system objects.

As used herein the term "plug-in" refers to one or more installed modules that may provide computer readable instructions, configuration information, rules, threshold values, parameter values, or the like, or combination thereof. Plug-ins may be used to define one or more pre-fetch policies, pre-fetch policies parameters/threshold values, rules, or the like. More than one plug-in may be installed at the same, each providing different or alternative information or policies. Additional plug-in may be provided or customized to support various pre-fetch policies that may support the operational considerations of the file systems.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a pre-fetch engine may be instantiated to perform actions for managing data in a file system, as described below.

In one or more of the various embodiments, the pre-fetch engine may be arranged to receive one or more read requests associated with the file system that includes one or more pre-fetch storage tiers and one or more file storage tiers of one or more storage devices.

In one or more of the various embodiments, the pre-fetch engine may be arranged to employ a pre-fetch policy selected from a plurality of pre-fetch policies to copy one or more blocks to the pre-fetch storage tier. In some embodiments, the selection of the pre-fetch policy may be based on one or more characteristics of the one or more read requests. And, in some embodiments, each pre-fetch policy includes instructions for copying one or more blocks on the file storage tier to the pre-fetch storage tier. In one or more of the various embodiments, the selection of the pre-fetch policy may be based on its association with a highest performance score that is associated with one or more previous read requests that are similar to the one or more read requests.

In one or more of the various embodiments, determining the selected pre-fetch policy may include selecting a no-copy pre-fetch policy that refrains from copying any blocks to the pre-fetch storage tier to minimize waste based on a prediction that pre-fetching the one or more blocks is unnecessary to improve performance.

In one or more of the various embodiments, the one or more characteristics of the one or more read requests, may include, information that includes one or more of block identifiers, user information, directory or folder information, volume identifier, storage device type identifiers, application hints, filenames, file extensions, file size, time of day, file access properties, network addresses, network ports, or the like.

In one or more of the various embodiments, the pre-fetch engine may be arranged to instantiate a machine learning engine to generating one or more input parameters based on the one or more characteristics of the one or more read requests. In one or more of the various embodiments, the machine learning engine may be arranged to provide the one or more input parameters to one or more machine learning models. And, in one or more of the various embodiments, the machine learning engine may be arranged to determine the selected pre-fetch policy based on one or more results from the one or more machine learning models.

In one or more of the various embodiments, the pre-fetch engine may be arranged to evaluate a performance of the selected pre-fetch policy to fulfill one or more subsequent read requests and also evaluating a simulated performance of each unselected pre-fetch policy based on the one or more subsequent read requests.

In one or more of the various embodiments, the pre-fetch engine may be arranged to provide a performance score based on the evaluation of the selected pre-fetch policy and providing one or more other performance scores based on the simulated evaluation of each unselected pre-fetch policy. In one or more of the various embodiments, providing the performance score may include: increasing the performance score based on a number of the one or more blocks that are read by the one or more subsequent read requests; decreasing the performance score based on a number of the one or more blocks that remain unread by the one or more subsequent read requests; and decreasing the performance score based on a number of one or more other blocks located on the file storage tier that are read by the one or more subsequent read requests, such that the one or more other blocks are unselected by the selected pre-fetch policy.

In one or more of the various embodiments, if one of the other performance scores for one of the unselected pre-fetch policies exceeds the performance score of the selected pre-fetch policy, the pre-fetch engine may be arranged to select one of the unselected pre-fetch policies as a new selected pre-fetch policy for further one or more subsequent read requests such that the new selected pre-fetch policy increases an amount of the further one or more subsequent read requests being fulfilled by the one or more blocks copied to the pre-fetch storage tier.

In one or more of the various embodiments, the pre-fetch engine may be arranged to store one or more associations of performance scores and the one or more characteristics of the one or more read requests. And, in some embodiments, further determine the selected pre-fetch policy based on the one or more associations.

In one or more of the various embodiments, the pre-fetch engine may be arranged to instantiating a machine learning engine to perform actions including: training one or more machine learning models based on one or more previous read requests and one or more previous performance scores, wherein the one or more machine learning models are trained to select the pre-fetch policy based on a first read request; and deploying the one or more trained machine learning models to select the pre-fetch policy based on the first read request.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
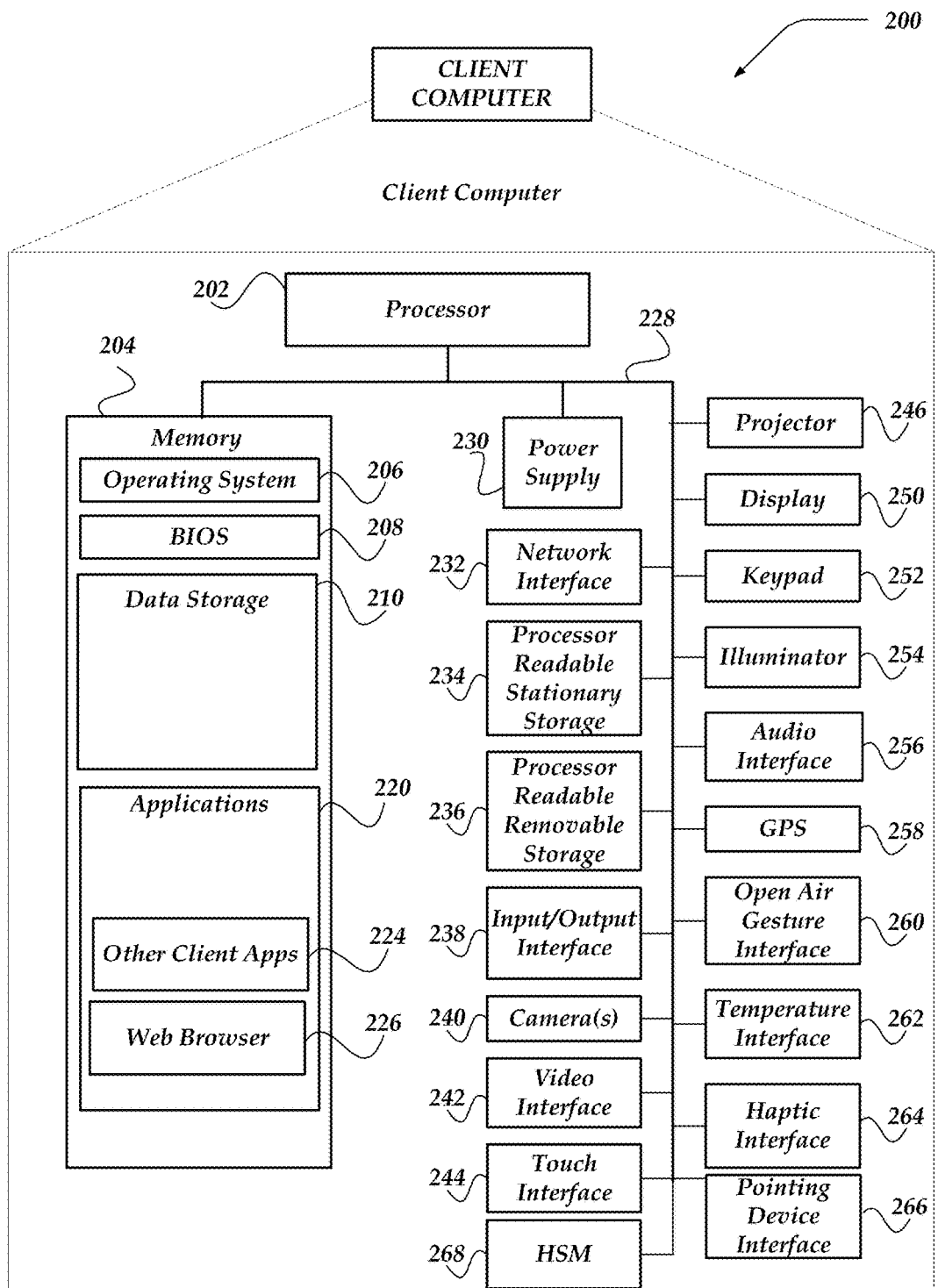
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer

200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
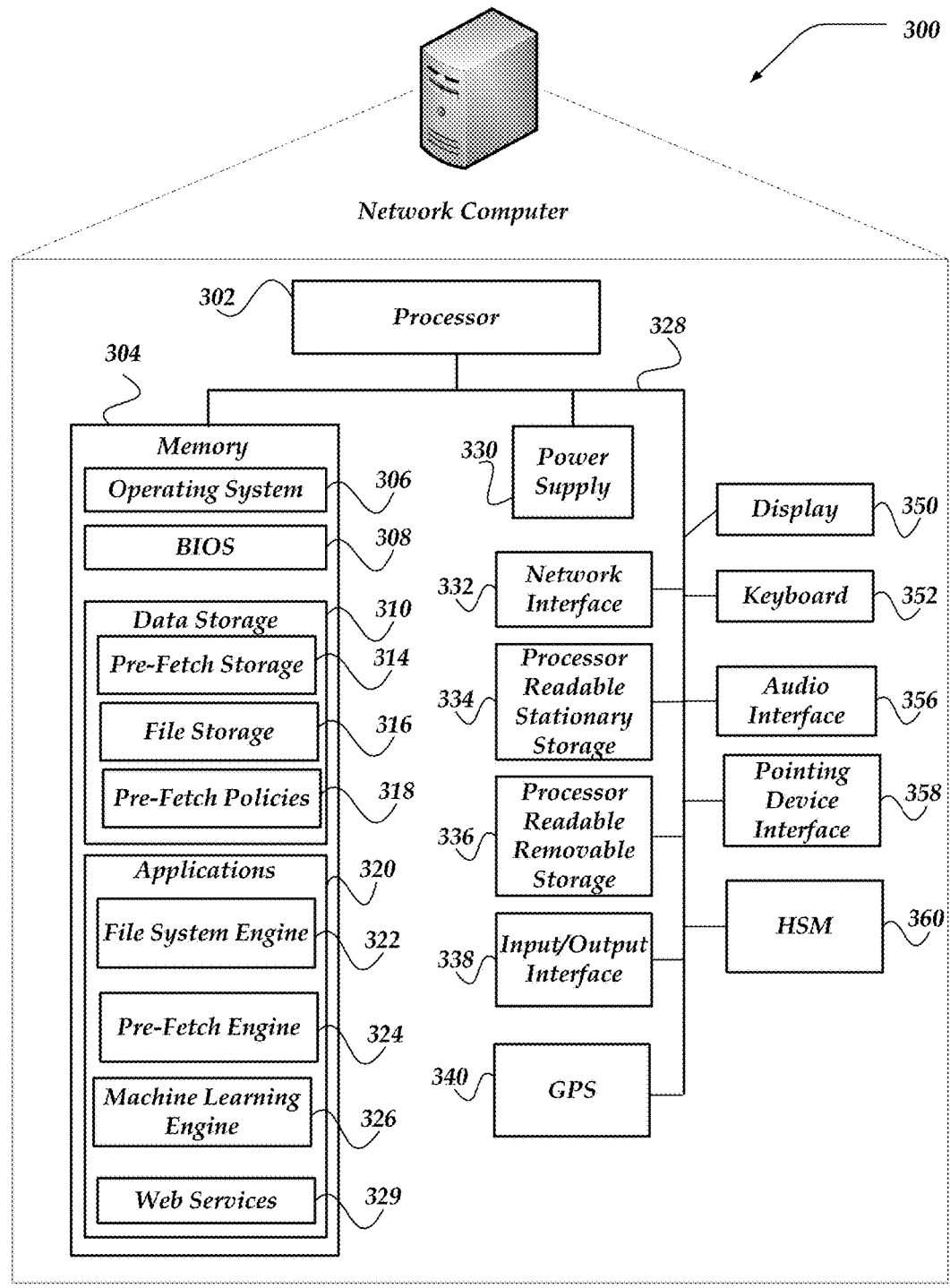
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, pre-fetch engine 324, machine learning engine 326, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, pre-fetch storage 314, file storage 316, pre-fetch policies 318, or the like. pre-fetch storage 314 or file storage 316 may store files, documents, versions, properties, permissions information, file meta-data, data structures, or the like, that represent one or more portions of a distributed file system. In some embodiments, various storable objects (e.g., file system objects) may be divided into one or more blocks or pages that are stored pre-fetch storage 314 or file storage 316.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, pre-fetch engine 324, machine learning engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, pre-fetch engine 324, machine learning engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, pre-fetch engine 324, machine learning engine 326, web services 329, or the like, may be provisioned and de-commissioned automatically.

Also, in one or more of the various embodiments, file system engine 322, pre-fetch engine 324, machine learning engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
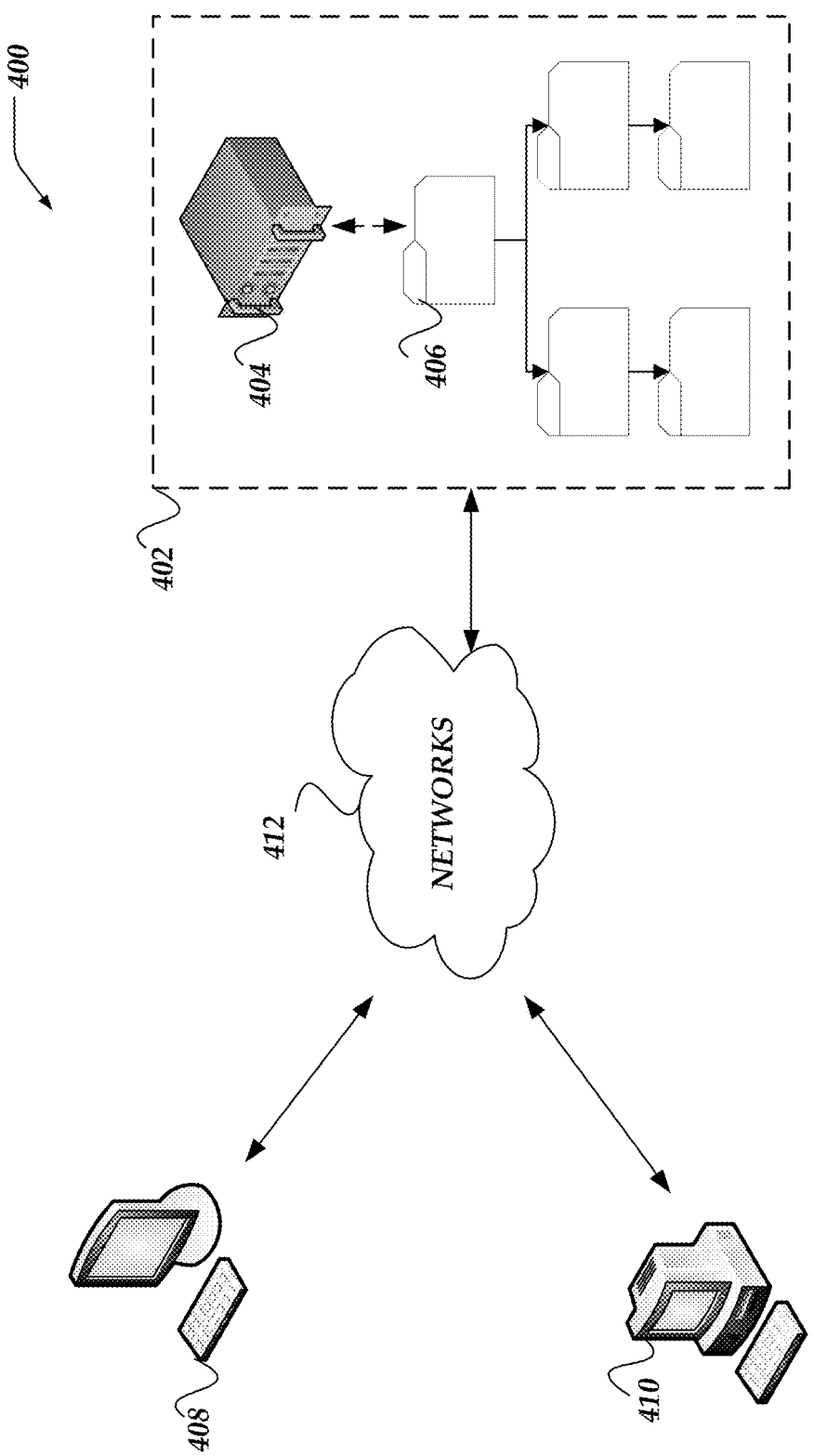
FIG. 4 illustrates a logical architecture of a system for dynamic evaluation and selection of file system pre-fetch policy in accordance with one or more of the various embodiments.

FIG. 4 illustrates a logical architecture of system 400 for dynamic evaluation and selection of file system pre-fetch policy in accordance with one or more of the various embodiments. In one or more of the various embodiments, file systems, such as, file system 402 may be arranged to be communicatively coupled to one or more networks, such as, networks 412. Accordingly, in one or more of the various embodiments, one or more clients, such as, client computer 408 and client computer 410 may be arranged to access file system 402 over networks 412. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404. Also, in one or more of the various embodiments, file systems, such as file system 402 may include one or more file system objects, such as file system object 406 that may represent the various objects or entities that may be in file system 402. In some embodiments, file system objects may include, files, documents, directories, folders, change records, file system journals, backups, snapshots, replication information, versions, branches, blocks, pages, or the like. In some embodiments, primitive file system objects, such as, blocks or pages, may be used to compose more complex file system objects.

In one or more of the various embodiments, the implementation details that enable file system 402 to operate may be hidden from clients such that they may be arranged to use file system 402 the same way they use other file systems, including local file systems. Accordingly, in one or more of the various embodiments, clients may be unaware that they are using a file system that supports one or more cache tiers because file system engines or cache engines may be arranged to mimic the interface or behavior of native file systems used by the clients.

Also, while file system 402 is illustrated as using one file system management computer with one set of file system objects, the innovations described herein are not so limited. Innovations herein contemplate file systems that include one or more file system management computers or one or more file system object data stores. In some embodiments, file system object stores (e.g., file storage 316) may be located remotely from one or more file system management computers. Also, a logical file system object store or file system may be spread across two or more cloud computing environments, storage clusters, one or more on-premises servers, or the like, or combination thereof.

Figure 5:
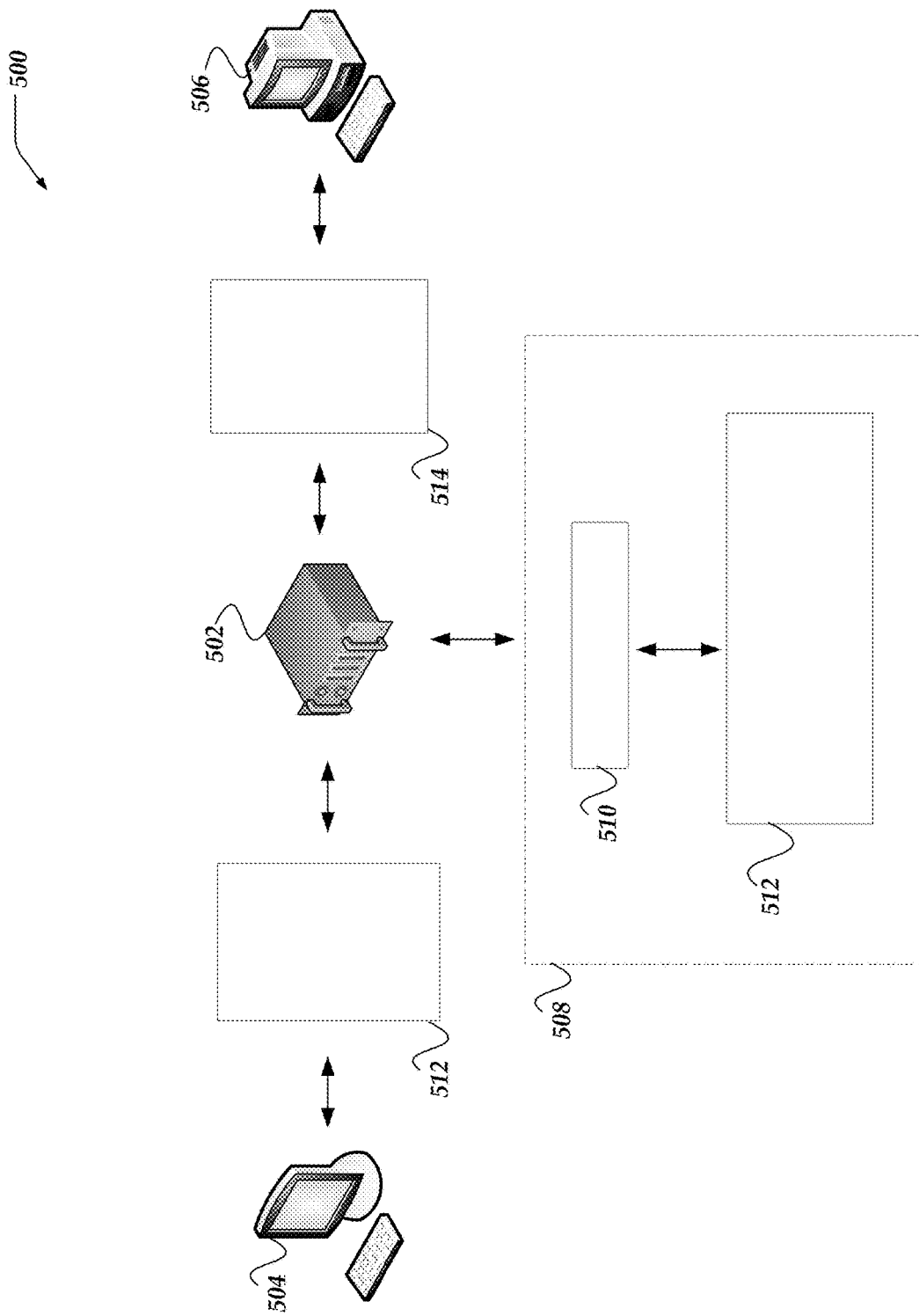
FIG. 5 illustrates a logical architecture of a file system that supports one or more pre-fetch policies in accordance with one or more of the various embodiments.

FIG. 5 illustrates a logical architecture of file system 500 that supports one or more pre-fetch policies in accordance with one or more of the various embodiments. As described above, file systems may include one or more file system management server computers, such as, file system management server computer 502. Also, in one or more of the various embodiments, one or more client computers, such as, client computer 504 and client computer 506 may access (e.g., read, write, or delete) one or more file system objects, such as, file system object 512 or file system object 514.

In one or more of the various embodiments, file system management server computer 502 may be arranged to store or manage of the storage of file system objects. In some embodiments, data storage 508 may represent one or more data storage systems or devices that may be used to store file system objects. In some embodiments, one or more data stores, such as, data storage 508 may include one or more pre-fetch storage tiers, such as, pre-fetch storage 510. Also, in some embodiments, data storage 508 may include one or more file storage tiers, such as file storage 512.

In one or more of the various embodiments, file system management server computer may be arranged to manage the distribution of file system objects onto pre-fetch storage 510 or file storage 512. In some embodiments, this may include managing or executing one or more pre-fetch policies that predictively store file system objects from file storage in pre-fetch storage.

Accordingly, in one or more of the various embodiments, file system management server computer may include one or more pre-fetch engines that may be instantiated to perform one or more actions to manage the selection of pre-fetch policies, evaluation of pre-fetch policies, execution of pre-fetch policies, or the like.

In one or more of the various embodiments, pre-fetch policies may be intended to pre-fetch blocks to store them in pre-fetch storage before a read request for the pre-fetched block is provided to file system management server computer 502. Accordingly, in one or more of the various embodiments, if one or more initial read requests are provided, the pre-fetch engine may be arranged to select a pre-fetch policy to pre-fetch additional blocks before a client has actually requested them. In one or more of the various embodiments, performance metrics associated with the selected pre-fetch policy and unselected pre-fetch policies may be tracked to evaluate and update the process used to select the pre-fetch policy.

Note, for brevity and clarity, data storage 508 is illustrated as having one pre-fetch storage and one file storage, one of ordinary skill in the art will appreciate that these innovations are not so limited. For example, in some embodiments, data storage for a file system may include two or more pre-fetch storage tiers or two or more file storage tiers. Accordingly, the innovations disclosed herein may be applied to systems having one or more pre-fetch storage tiers or one or more file storage tiers.

Figure 6A:
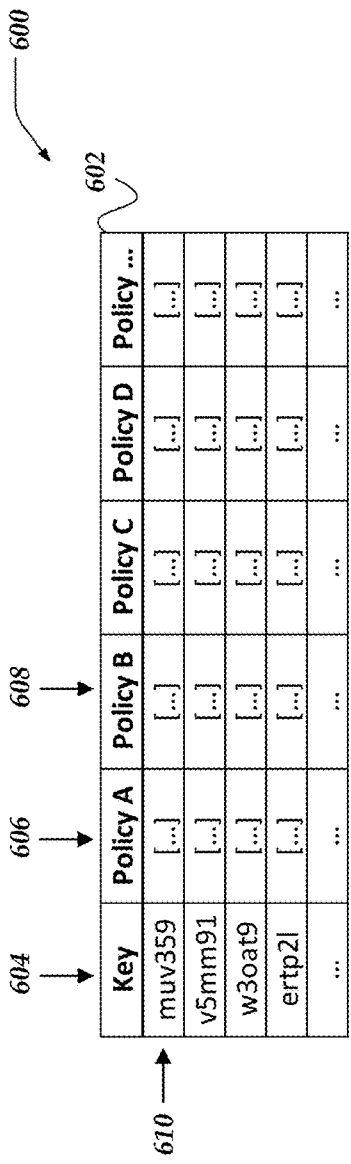
FIG. 6A illustrates a logical schematic of pre-fetch policy storage that supports dynamic evaluation and selection of file system pre-fetch policies in accordance with one or more of the various embodiments.

FIG. 6A illustrates a logical schematic of a portions of pre-fetch policy storage 600 that supports dynamic evaluation and selection of file system pre-fetch policy in accordance with one or more of the various embodiments. In one or more of the various embodiments, a pre-fetch policy store may include one or more data objects, such as, data object 602. In one or more of the various embodiments, data object 602 may be arranged to include various attributes, such as, request key 604 and information associated with one or more pre-fetch policies, such as, pre-fetch policy 606, pre-fetch policy 608, or the like.

In one or more of the various embodiments, request keys may be keys that correspond to different read requests. In some embodiments, the pre-fetch engine may be arranged to generate request keys from information comprising or associated with incoming read requests. For example, in some embodiments, file system engines may provide read requests that include a block identifier and an offset or range. Accordingly, in this example, the block identifier may correspond to a particular block in file storage or pre-fetch storage that may be the first block requests and the range value may represent the number of blocks after that to read. For example, for some embodiments, if a read request such as <block ID=0100, range=1024> is provided, it may be interpreted as a request to read 1024 blocks starting at a block identified as 0100. In practice, for some embodiments, client read requests may directed to reading higher level file system objects, such as, documents, streams, or the like. However, the operating system or file system engine may be arranged to decompose such requests into one or more block reads.

In one or more of the various embodiments, read requests may include additional information, including one or more tags, labels, sequence numbers, source, target, cluster/group identifiers, timestamps, digital signatures, or the like, and are not limited to a tuple comprising block ID and block range.

Accordingly, in one or more of the various embodiments, the pre-fetch engine may be arranged to generate a read request key from information provided or associated with the read request. In some embodiments, pre-fetch engines may include key generators that generate a key based on hashing one or more read request attribute values, build a string key from one or more attributes, or the like. For example, for item 610 of data object 602, the request key value muv359 may be generated by hashing a portion of the read request. Alternatively, other key generation methods may be used, such as, concatenating some or all of the read request attributes into a string. For example, in some embodiments, a read request tuple <block ID=0100, range=1024> may be converted to string such as "0100+1024" that may be used as the request key.

In one or more of the various embodiments, the pre-fetch engine may be arranged to select one or more particular key generators or one or more key generators control parameters based on configuration information provided by configuration files, pre-fetch policies, built-in defaults, user input, plug-ins, or the like, combination thereof.

Accordingly, in one or more of the various embodiments, if a read request may be provided to the pre-fetch engine, the pre-fetch engine may generate a request key to identify or lookup an item in data object 602 such as item 610. In one or more of the various embodiments, item 610 represents a collection of performance information associated with one or more pre-fetch policies and one or more read requests correspond to the request key.

In one or more of the various embodiments, pre-fetch policies may represent rules or instructions that implement one or more pre-fetch strategies. In one or more of the various embodiments, various pre-fetch policies may be directed to particular known read patterns. Also, in one or more of the various embodiments, one or more one or more pre-fetch policies may be learned by machine learning. In some embodiments, one or more pre-fetch policies may be customized for specific use cases that may be unique an organization or enterprise.

In one or more of the various embodiments, one simple but often effective pre-fetch policy may include pre-fetching a defined number of blocks in sequence starting with the block ID provided in the read request. For example, an naïve pre-fetch policy may simply pre-fetch the first 1024 blocks that come after the block ID provided by the read request and load them in ID order on pre-fetch storage. This type of pre-fetch policy expects clients to continue reading block in ID sequence. If the client actually reads the block in a different order, pre-fetching the 1024 block may be useless.

In one or more of the various embodiments, other pre-fetch policies may be nuanced or otherwise tailored to different read patterns. For example, in some embodiments, an application that read blocks in a different sequential order than block IDs may be ill-served by a pre-fetch policy that fetches blocks in ID order rather than the order the application may expect. However, if the pre-fetch policy pre-fetched blocks in the order expected by the application, performance gains may be obtained. Likewise, for example, if an application is known to read 512 sequential blocks in a row before requesting a block from a different starting location, a pre-fetch policy that pre-fetches 512 blocks rather than pre-fetching 256 or 1024 blocks may provide performance improvements.

In one or more of the various embodiments, pre-fetch policy may include leveraging one or more characteristics of the file system objects associated with a read request, such as, originating user, filename, filename patterns, file extensions, date or time information, file access permissions, file location (e.g., directory, folder, cluster, volume, or the like), compressed data, content type (e.g., text, video, audio, or the like), owner, or the like.

However, in one or more of the various embodiments, most file systems, including distributed file system may have to support different read patterns for one or more application, users, or the like. In some cases, two or more clients may use different read patterns even though they read the same data. Also, in some cases, the same client, user, or application, may use different read patterns depending on local circumstances. Accordingly, in one or more of the various embodiments, configuring a file system to use an optimal pre-fetch policy may be difficult if not impossible because a pre-fetch policy may improve performance for one read pattern and degrade performance for another read pattern.

Accordingly, in one or more of the various embodiments, the pre-fetch engine may be arranged to dynamically select a pre-fetch policy depending on one or more characteristics of a given read request. Likewise, in one or more of the various embodiments, the pre-fetch engine may be arranged to evaluate the performance of one or more pre-fetch policies for different read requests. Thus, in some embodiments, pre-fetch engines may be arranged to evaluate the performance of pre-fetch policies and employ the evaluations to inform the selection of pre-fetch policies.

In this example, data object 602 illustrates how a file system may have several pre-fetch policies that may be available. In some embodiments, a data object, such as, data object 602 may be used to track one or more performance metrics for each policy. In some embodiments, such performance metrics may be employed as part the process for selecting a pre-fetch policy to use with a read request.

In one or more of the various embodiments, request keys may be arranged to be associated with one or more types of read requests, such that a subsequent read request may be mapped to a previously seen read request key.

In one or more of the various embodiments, the pre-fetch engine may be arranged to select one pre-fetch policy that is used for servicing a given read request. However, in one or more of the various embodiments, the pre-fetch engine may be arranged to simulate the operation of the one or more other pre-fetch policies (unselected pre-fetch policies). Thus, in one or more of the various embodiments, the pre-fetch engine may be arranged to evaluate how one or more pre-fetch policies would have performed if they had been selected. Accordingly, in some embodiments, the pre-fetch engine may be arranged to select the better performing pre-fetch policy the next time the same kind read request is provided.

Likewise, in one or more of the various embodiments, if none of the one or more pre-fetch policies perform materially better than other, the pre-fetch engine may be arranged to select a least expensive pre-fetch policy. For example, if all the pre-fetch policies perform about the same, the pre-fetch engine may be arranged to select the pre-fetch policy that uses the least amount of computing, storage, or communication resources.

In one or more of the various embodiments, there may be some read requests that may not require or benefit from pre-fetching. Accordingly, in one or more of the various embodiments, the pre-fetch engine may select a pre-fetch policy that does not perform any pre-fetching. Similarly, in one or more of the various embodiments, the pre-fetch engine may be arranged to determine that a read request does not match any pre-fetch policy. Thus, in some embodiments, the pre-fetch engine may not associate a pre-fetch policy with the request.

In one or more of the various embodiments, if the pre-fetch engine determines that a read request is not suitable for pre-fetching, the pre-fetch engine may be arranged to refrain from performing pre-fetch actions associated with the read request, such as, generating request keys, executing pre-fetch policies, simulating pre-fetch policies, or the like.

In one or more of the various embodiments, the pre-fetch engine may be arranged to support one or more pre-fetch policies. The one or more pre-fetch policies or one or more threshold values, condition values, rule parameters, or the like, may be provided based on configuration information provided by configuration files, plug-ins, pre-fetch policies, built-in defaults, user input, or the like, combination thereof.

In one or more of the various embodiments, the pre-fetch engine may be arranged to learn which of the one or more pre-fetch policies are advantageous for a given read request type. Accordingly, in one or more of the various embodiments, if the initial pre-fetch policy selected for a read request is not optimal as compared to other available pre-fetch policies, the pre-fetch engine may select a different pre-fetch policy the next time a similar read request is provided.

In one or more of the various embodiments, request keys for different (e.g., subsequent) read request may have the same value such that evaluation information from prior read requests may be used for selecting a pre-fetch policy. In some embodiments, components or characteristics used to generate request key for a provided read request may be selected such that read request that may be similar may be assigned the same key. This may enable read requests that have similar characteristics to benefit from the pre-fetch history learned from previous similar read requests.

Alternatively, in one or more of the various embodiments, each read request may be assigned its own request key. However, in some embodiments, read requests may be assigned an initial collection of policy evaluation information based on previous read requests that have one or more similar characteristics. For example, the file system engine may be arranged to include a tag with each read request that is associated the type of client application associated with the read request. Accordingly, in this example, for some embodiments, the pre-fetch engine may be arranged to associate each read request having a certain tag with pre-fetch policy history of previous read requests associated with the same tag. Thus, in one or more of the various embodiments, each read request may have its own unique request key but still be able to inherit pre-fetch history from previous similar read request. This may enable pre-fetch engines to use learned history from similar read requests while tracking each read request individually. Accordingly, in one or more of the various embodiments, the pre-fetch engine may be arranged to enable read requests to inherit pre-fetch history based on its similarities to previous read requests.

In one or more of the various embodiments, the pre-fetch engine may be arranged to employ a machine learning engine, such as, machine learning engine 326 to select the pre-fetch policy for one or more read requests. In one or more of the various embodiments, one or more classifiers may be trained to select pre-fetch policies for incoming read requests.

In one or more of the various embodiments, the pre-fetch engine may be arranged to compose one or more characteristics associated with read requests into parameter vectors, or the like. Accordingly, in one or more of the various embodiments, the parameter vectors may be provided to one or more machine learning models or classifiers that may be trained to select pre-fetch policies. In some embodiments, the pre-fetch engine may be arranged to scale, normalize, balance, shift, or the like, one or more of the elements of the parameter vector based on configuration information before providing the parameter vector to a machine learning classifier, or the like.

Likewise, in one or more of the various embodiments, the pre-fetch engine may be arranged to employ one or more heuristics to filter or pre-classify a read request before providing the parameter vector to the machine learning classifier. For example, in one or more of the various embodiments, such pre-classification may determine a read request is not eligible or suitable for pre-fetching.

Figure 6B:
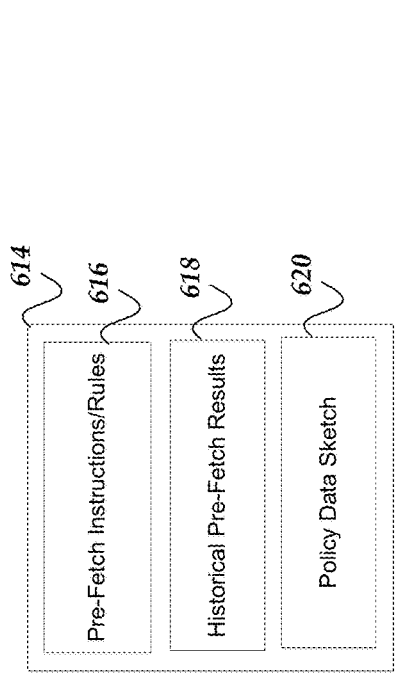
FIG. 6B illustrates a logical schematic of pre-fetch policy information for a pre-fetch policy in accordance with one or more of the various embodiments.

FIG. 6B illustrates a logical schematic of pre-fetch policy information 612 for a pre-fetch policy. In one or more of the various embodiments, pre-fetch policy information 612 may include data structure 614 that includes one or more of pre-fetch instructions 616, pre-fetch history 618, pre-fetch policy data sketch 620, or the like. In one or more of the various embodiments, pre-fetch policy information 612 may be a data object that represents the pre-fetch policy information stored in data object 602 for each request key and pre-fetch policy.

In one or more of the various embodiments, pre-fetch instructions 616 may include the instructions or rules the define a pre-fetch policy. In some embodiments, pre-fetch instruction 616 may be a reference, link, or pointer to the actual instructions rather the instructions being embedded in data structure 614. In one or more of the various embodiments, pre-fetch history 618 may be a data structure that stores the results of a pre-fetch policy. And, in some embodiments, pre-fetch policy data sketch 620 may include aggregate information that may be used to rapidly characterize or evaluate the pre-fetch policy with respect to a read request or read request family. For example, pre-fetch policy data sketch 620 may include information, such as, hit total, miss total, waste, or the like. A hit may be recorded each time a pre-fetched block is read. A miss may be scored each a block that was not pre-fetched is read. And, waste may represent the number of pre-fetched blocks that were not read at all.

Generalized Operations

FIGS. 7-11 represent generalized operations for dynamic evaluation and selection of file system pre-fetch policy in accordance with one or more of the various embodiments. In one or more of the various embodiments, processes 700, 800, 900, 1000, and 1100 described in conjunction with FIGS. 7-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-11 may perform actions for file system cache tiers in accordance with at least one of the various embodiments or architectures such as those described in conjunction with FIGS. 4-6. Further, in one or more of the various embodiments, some or all of the actions performed by processes 700, 800, 900, 1000, and 1100 may be executed in part by file system engine 322, pre-fetch engine 324, or machine learning engine 326 running on one or more processors of one or more network computers.

Figure 7:
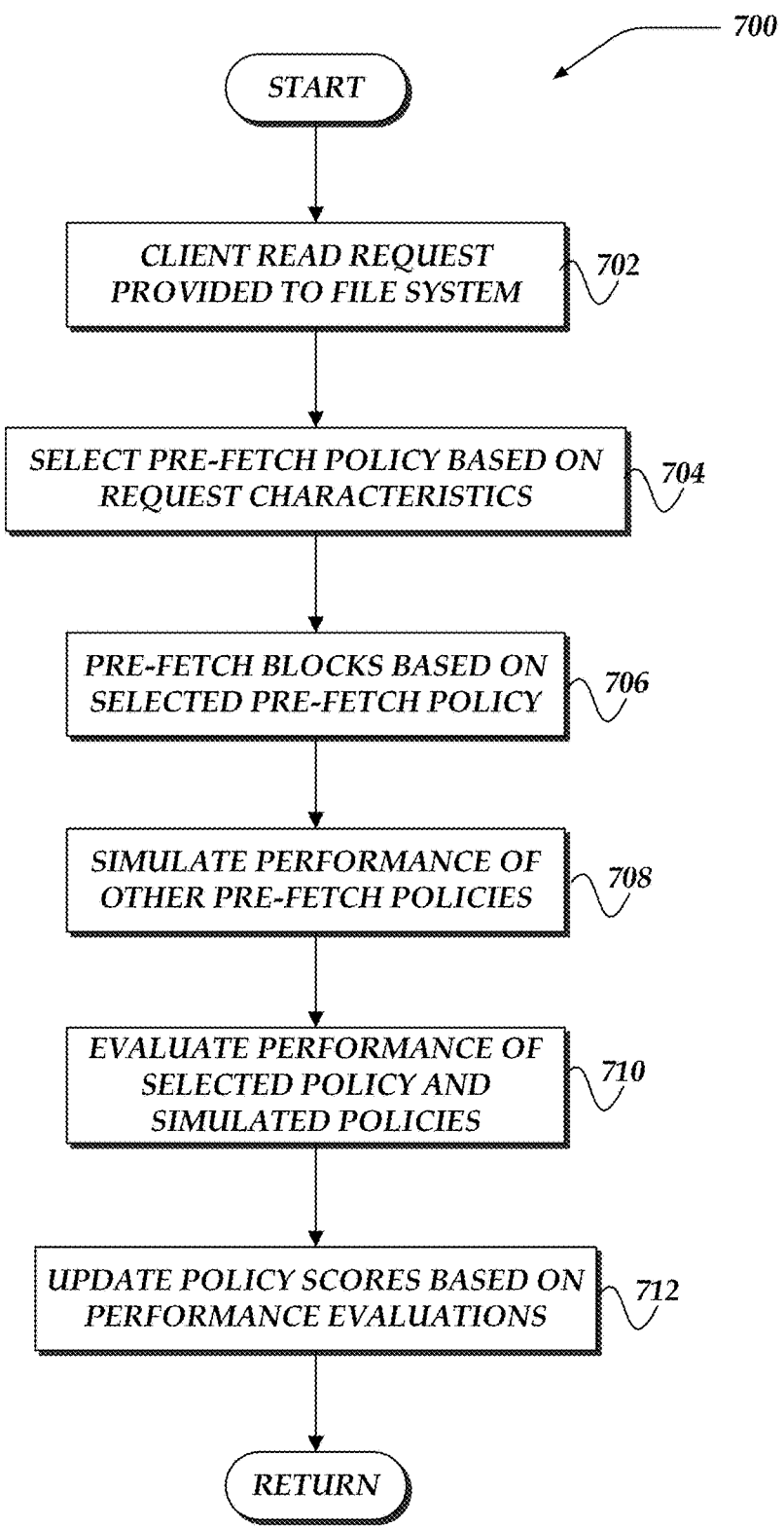
FIG. 7 illustrates an overview flowchart of a process for dynamic evaluation and selection of file system pre-fetch policy in accordance with one or more of the various embodiments.

FIG. 7 illustrates an overview flowchart of process 700 for dynamic evaluation and selection of file system pre-fetch policy in accordance with one or more of the various embodiments. After a start flowchart block, at flowchart block 702, in one or more of the various embodiments, a client read request may be provided to a file system engine. In one or more of the various embodiments, as client read requests come into the file system they may be initially handled by the file system engine. Accordingly, in one or more of the various embodiments, the file system engine may be arranged to package the incoming read request with additional information related to the read request and provide it to the pre-fetch engine.

In one or more of the various embodiments, the file system engine and pre-fetch engine may operate independently. In some embodiments, if a read request is provided, the file system engine may be arranged to attempt to read the requested one or more blocks from pre-fetch storage. if the requested blocks are not available in pre-fetch storage, the file system engine may read the requested blocks from file storage.

At flowchart block 704, in one or more of the various embodiments, the pre-fetch engine may be arranged to select a pre-fetch policy based on one or more characteristics of the read request. In one or more of the various embodiments, pre-fetch engines may be arranged to employ one or more selection rules, machine learning models (e.g., classifiers), or the like, to select a pre-fetch policy based on the characteristics of one or more read requests. In some embodiments, one or more characteristics may be based on historical information associated with related read requests. As mentioned above, the pre-fetch engine may be arranged to determine that the read request is not suitable for pre-fetching. Accordingly, in some embodiments, a selected pre-fetch policy may include refraining from pre-fetching any block at all.

In one or more of the various embodiments, the pre-fetch policies may be seen as competing against each other in real time for each active session. Pre-fetch policies are being evaluated based on how well they predict read patterns in that session. In some embodiments, the evaluation takes the form of a performance score. Accordingly, the highest scoring policy may be used for pre-fetching.

In one or more of the various embodiments, the pre-fetch policy performance score may be computed based on one or more rules. In some embodiments score may be based on monitoring the correctness of the predictions made by the pre-fetch policy. For example, performance scores for policies that are more successful at predicting the blocks that are actually read may be increased;

performance scores for policies that predict blocks that are not read may be decreased; or performance scores for policies that fail to predict blocks that were read but not pre-fetched may be decreased. At flowchart block 706, in one or more of the various embodiments, the pre-fetch engine or file system engine may be arranged to pre-fetch one or more blocks that may be associated with the read request. In one or more of the various embodiments, pre-fetch policies include machine interpretable rules or instructions that define the blocks that may be pre-fetched.

At flowchart block 708, in one or more of the various embodiments, the pre-fetch engine may be arranged to simulate the pre-fetch actions for one or more other pre-fetch policies. In one or more of the various embodiments, as the selected pre-fetch policy is pre-fetching blocks for storage in a pre-fetch store, the pre-fetch engine may determine the blocks that would have been pre-fetched by the unselected pre-fetch policies. This information may be determined without actually accessing, visiting, or moving blocks. The pre-fetch engine may compute the blocks that an unselected pre-fetch policy would have pre-fetched without actually performing the pre-fetch.

At flowchart block 710, in one or more of the various embodiments, the pre-fetch engine may be arranged to evaluate the performance of the selected pre-fetch policy and simulated performance of the one or more pre-fetch policies that were not selected. In one or more of the various embodiments, the pre-fetch engine may observe the blocks that the selected pre-fetch policy pre-fetched and the how many of those blocks were actually read by client. Also, in one or more of the various embodiments, the pre-fetch engine may compare the read requests or read blocks to the simulated pre-fetching associated with the unselected pre-fetch policies. Thus, in some embodiments, the performance of the selected pre-fetch policy may be compared to the performance of the unselected pre-fetch policies.

At flowchart block 712, in one or more of the various embodiments, the pre-fetch engine may be arranged to update pre-fetch policy history of the selected pre-fetch policy and the one or more pre-fetch policies that were not selected. In one or more of the various embodiments, this historical information may be used to select a different pre-fetch policy if one or more read requests having similar characteristics are encountered.

In one or more of the various embodiments, pre-fetch policy selection may be made on a per session basis. In some embodiments, a session may be considered a logical stream of work being done by a client on a set of related file system objects. Accordingly, in some embodiments, different policies may be successful for different sessions.

In one or more of the various embodiments, the pre-fetch engine may be arranged to choose the best policy for each session in real time. For example, in some embodiments, there may be tens or hundreds of sessions active in the distributed file system at any given time. Each session may be associated with a pre-fetch policy that is selected based on its associated one or more read requests.

Next, control may be returned to a calling process.

Figure 8:
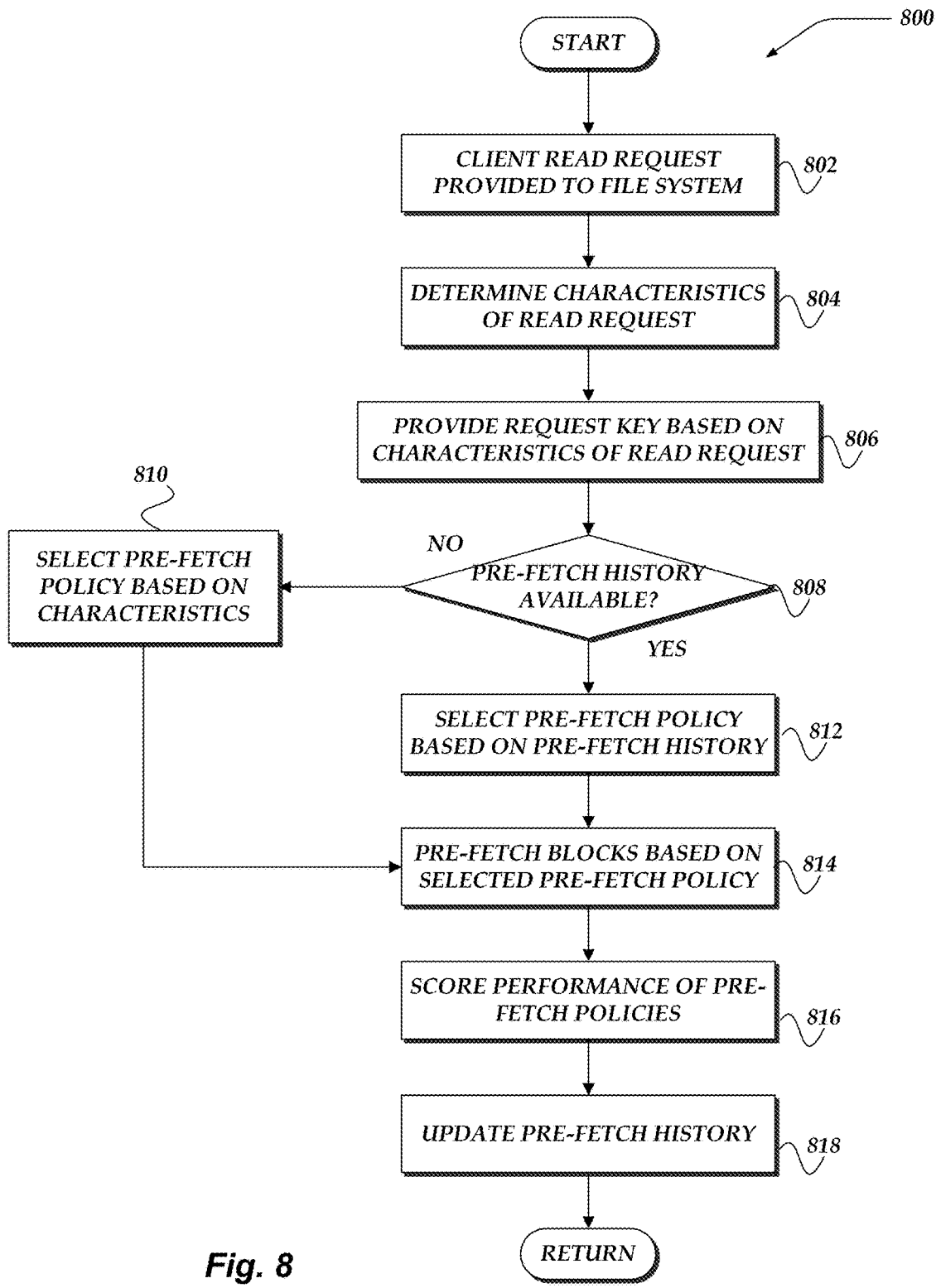
FIG. 8 illustrates a flowchart of a process for dynamic evaluation and selection of file system pre-fetch policy in accordance with one or more of the various embodiments.

FIG. 8 illustrates a flowchart of process 800 for dynamic evaluation and selection of file system pre-fetch policy in accordance with one or more of the various embodiments. After a start flowchart block, at flowchart block 802, in one or more of the various embodiments, a client read request may be provided to a file system engine. In one or more of the various embodiments, as client read requests come into the file system they may be initially handled by the file system engine. Accordingly, in one or more of the various embodiments, the file system engine may be arranged to package the incoming read request with additional information related to the read request and provide it to the pre-fetch engine.

In one or more of the various embodiments, the file system engine and pre-fetch engine may operate independently. In some embodiments, if a read request is provided, the file system engine may be arranged to attempt to read the requested one or more blocks from pre-fetch storage. if the requested blocks are not available in pre-fetch storage, the file system engine may read the requested blocks from file storage.

At flowchart block 804, in one or more of the various embodiments, the pre-fetch engine may be arranged to determine one or more characteristics of the read request. In one or more of the various embodiments, the pre-fetch engine may be arranged to one or field, attributes, or the like, included with the read request or provided by the file system engine. In some embodiments, these characteristics may include information that provides context for selecting a pre-fetch policy. In some embodiments, these may include block IDs, user information, directory/folder information, volume, storage device type (e.g., HDD, SSD, flash memory, memory cards), application hints (e.g., application, application type, application owner, or the like), filename, file extension, file size, time of day, file access properties, network address, network port, or the like.

At flowchart block 806, in one or more of the various embodiments, the pre-fetch engine may be arranged to provide a request key based on one or more characteristics of read request. As discussed above, one or more characteristics of the read request may be provided to a key generator that provides a request key that may be associated with a read request. In some embodiments, a request key may be arranged to represent a class of read requests. In some embodiments, a request key may include two parts, one for uniquely identifying the specific read request and one part for associating the read request with a class of read requests. In some embodiments, the two parts may be separate or they may be part of the same data structure. For example, if a request key comprises <block ID, timestamp>-<user ID, application ID>, the first portion may be used to uniquely identify the individual request while the second part may be used to identify the class or type of the request.

In one or more of the various embodiments, the request key may be a key generated based on a unique identifier generated by combining one or more characteristics (or fields) of the read request into a key that may act as a primary key identifying or labeling the read request. For example, in some embodiments, a key generator may be arranged to combine a block ID associated with the request and a timestamp or sequence number to provide a request key.

At flowchart decision block 808, in one or more of the various embodiments, if there is pre-fetch history available for the incoming read request, control may flow to flowchart block 812; otherwise, control may flow to flowchart block 810. In one or more of the various embodiments, the pre-fetch engine may be arranged to attempt to lookup pre-fetch history for the read request. In some embodiments, if the request key (or portions or the request key) enables the lookup or indexing of classes or types of read requests, it may be used to attempt to lookup pre-fetch history for the read request from the pre-fetch history store. For example, if the request key is arranged for bucketing read requests, there may be a request key in the pre-fetch history store that have the same value as an incoming request. Accordingly, in this example, the pre-fetch history associated with prior read requests that were assigned to the same bucket as the pending read request by the key generator may be selected.

In one or more of the various embodiments, the pre-fetch engine may be arranged to query the pre-fetch history store for pre-fetch history associated with prior read requests that are similar to the pending read request. Accordingly, in one or more of the various embodiments, the pre-fetch engine may be arranged to form a query based on some or all of the characteristics of the read request. For example, if characteristics of pending read request include file-extension=tz, file-size=XXL, the pre-fetch engine may be arranged to query its pre-fetch history store for pre-fetch history associated with prior read requests having file-extension=tz and file-size=XXL.

In some embodiments, the query may be arranged to select pre-fetch history based on partial matches. For example, the pre-fetch engine may be arranged to search for pre-fetch history using a characteristics query, such as, A=X, B=Y, C=Z where A, B, C are characteristics of the read request. In this example, for some embodiments, the closest match, if any, in the pre-fetch history store may be selected. For example, if there is a first pre-fetch history that is associated with A=X and a second pre-fetch history that is associated with A=X, C=Z, the second pre-fetch history may be selected.

In some embodiments, the characteristics used for searching for pre-fetch history in the pre-fetch history store may be weighted such that a partial match of one or more higher weighted characteristics may be selected over other lower weighted characteristics. For example, in some embodiments, characteristic A may be weighted to give it priority over other characteristics, such as, a query for A=X and B=Y and C=Z may return pre-fetch history that is associated with characteristic A=X over pre-fetch history associated with B=Y and C=Z. Alternatively, in some embodiments, rather than assigning weights to characteristics, characteristics may be arranged into hierarchal trees to find the best matching pre-fetch history.

At flowchart block 810, in one or more of the various embodiments, in the absence of matching pre-fetch history, the pre-fetch engine may be arranged to execute one or more rules or heuristics to select a pre-fetch policy. In one or more of the various embodiments, selecting a pre-fetch policy based on read request characteristics may be similar to querying for prior pre-fetch history. Except here, the characteristics of the read request are used to select a pre-fetch policy rather than selecting pre-fetch history. In one or more of the various embodiments, rules for selecting a pre-fetch policy may map read request having one or more particular characteristics to a particular pre-fetch policy. For example, in one or more of the various embodiments, a rule may provide for mapping a particular pre-fetch policies to read requests based on file-extension, applications, volume, or the like. Similar to rules for matching read request to pre-fetch history, in some embodiments, the rules for selecting one or more pre-fetch policies may be hierarchal or weighted. In some embodiments, rules for selection a pre-fetch policy based on read request rather than pre-fetch history may be provided based on configuration information provided by configuration files, plug-ins, file system policies, pre-fetch policies, built-in defaults, user input, or the like, combination thereof.

At flowchart block 814, in one or more of the various embodiments, the pre-fetch engine or file system engine may be arranged to pre-fetch one or more blocks based on the selected pre-fetch policy. As discussed above, the selected pre-fetch policy may be a no-copy pre-fetch policy that does not select or predict that any blocks should be pre-fetched.

At flowchart block 816, in one or more of the various embodiments, the pre-fetch engine may be arranged to evaluate the performance of the selected pre-fetch policy. In some embodiments, the evaluation may result in individual performance scores that may be associated with the one or more pre-fetch policies, including the selected policy or unselected policies.

At flowchart block 818, in one or more of the various embodiments, the pre-fetch engine may be arranged to update the pre-fetch history associated with the one or more pre-fetch policies based on their performance or performance scores.

Next, control may be returned to calling process.

Figure 9:
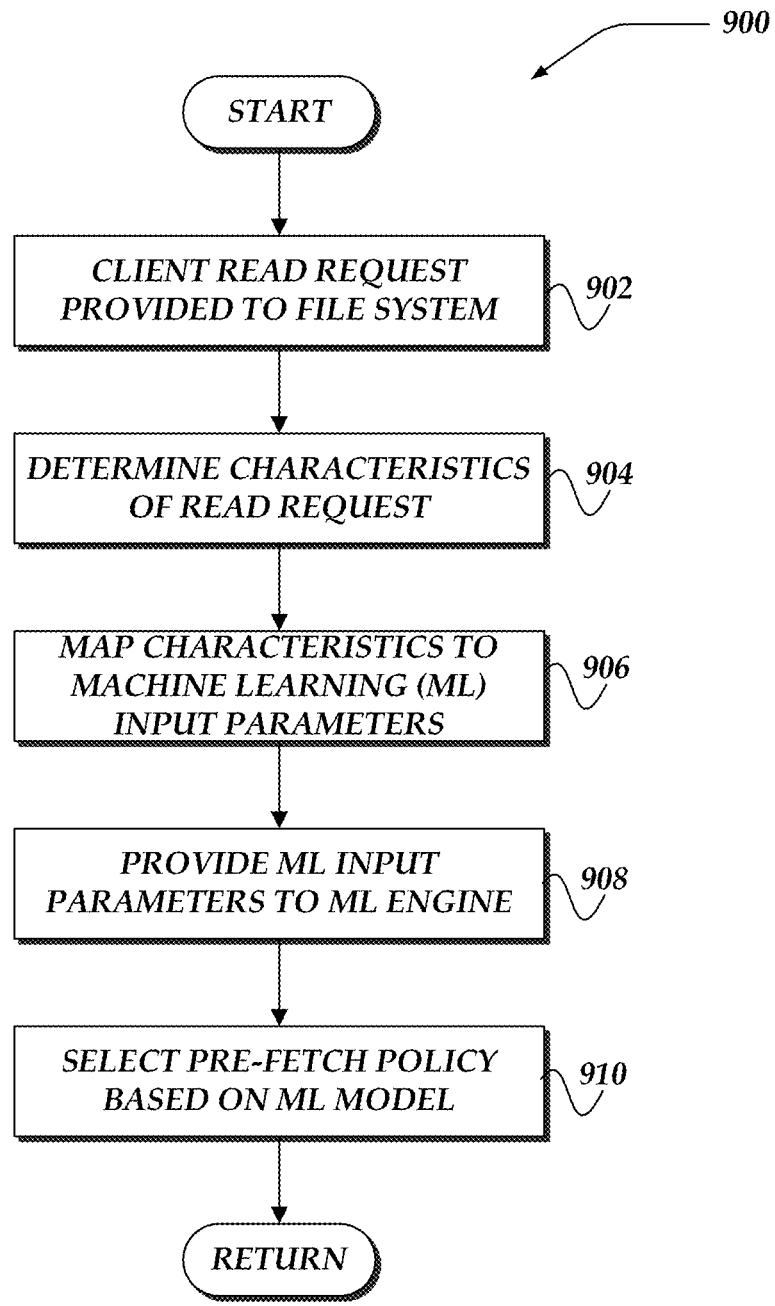
FIG. 9 illustrates a flowchart of a process for selection of a pre-fetch policy using machine learning in accordance with one or more of the various embodiments.

FIG. 9 illustrates a flowchart of process 900 for selection of a pre-fetch policy using machine learning in accordance with one or more of the various embodiments. After a start flowchart block, at flowchart block 902, in one or more of the various embodiments, a client read request may be provided to a file system engine. In one or more of the various embodiments, as client read requests come into the file system they may be initially handled by the file system engine. Accordingly, in one or more of the various embodiments, the file system engine may be arranged to package the incoming read request with additional information related to the read request and provide it to the pre-fetch engine.

In one or more of the various embodiments, the file system engine and pre-fetch engine may operate independently. In some embodiments, if a read request is provided, the file system engine may be arranged to attempt to read the requested one or more blocks from pre-fetch storage. if the requested blocks are not available in pre-fetch storage, the file system engine may read the requested blocks from file storage.

At flowchart block 904, in one or more of the various embodiments, the pre-fetch engine may be arranged to determine one or more characteristics that may be associated with the read request. In some embodiments, these characteristics may include information that provides context for selecting a pre-fetch policy. In some embodiments, these may include block IDs, user information, directory/folder information, volume, storage device type (e.g., HDD, SSD, flash memory, memory cards), application hints (e.g., application, application type, application owner, or the like), filename, file extension, file size, time of day, file access properties, network address, network port, or the like.

At flowchart block 906, in one or more of the various embodiments, the pre-fetch engine may be arranged to map some or all of the characteristics to one or more machine learning input parameter vectors. In one or more of the various embodiments, raw metrics associated with one or more characteristics of the read requests may be mapped to one or more values suitable for providing to a machine learning model for evaluation of classification. In one or more of the various embodiments, the characteristics that may be mapped to machine learning input parameters may match the parameters that were used to develop or train the machine learning models used for selecting pre-fetch policies. In some embodiments, mapping may include: mapping discrete/categorical valued parameters to numeric values bucketing continuous values into one or more values, normalizing one or more values to defined range, rounding values up or down, truncating numeric or string value, padding numeric or string values, scaling or weight values based on defined coefficients, or the like, or combination thereof.

At flowchart block 908, in one or more of the various embodiments, the pre-fetch engine may be arranged to provide input parameter vector(s) to a machine learning engine. In one or more of the various embodiments, the machine learning engine may be arranged to provide the parameters to one or more machine learning models to select a pre-fetch policy. In some embodiments, more than one machine learning model may be tested.

At flowchart block 910, in one or more of the various embodiments, a pre-fetch policy may be selected based on the machine learning engine and one or more machine learning models. Accordingly, in one or more of the various embodiments, a machine learning model that produces an answer that has the highest confidence value may be used to select the pre-fetch policy. In some embodiments, pre-fetch engine may select a pre-fetch policy that may be a consensus best choice of two or more models. In some embodiments, pre-fetch engine may be arranged to discount or offset the confidence values associated with one or more machine learning models based on the recent or long term history of the models. For example, a machine learning model that has selected pre-fetch policies that perform poorly may be associated with grade/score that is used to diminish its impact on selecting the pre-fetch policy.

In one or more of the various embodiments, one or more machine learning model may be successful at filtering or excluding some pre-fetch policies from consideration rather than selecting a pre-fetch policy. Accordingly, in one or more of the various embodiments, one or more machine learning models may be tested before testing other models. Likewise, the results of previous machine learning models may drive the testing of subsequent machine learning models. For example, in some embodiments, a pre-fetch engine may be configured such that the read request is evaluated by a first model with the result of that first evaluation determining one or more machine learning models to use for selecting the pre-fetch policy to use for pre-fetching.

Next, control may be returned to a calling process.

Figure 10:
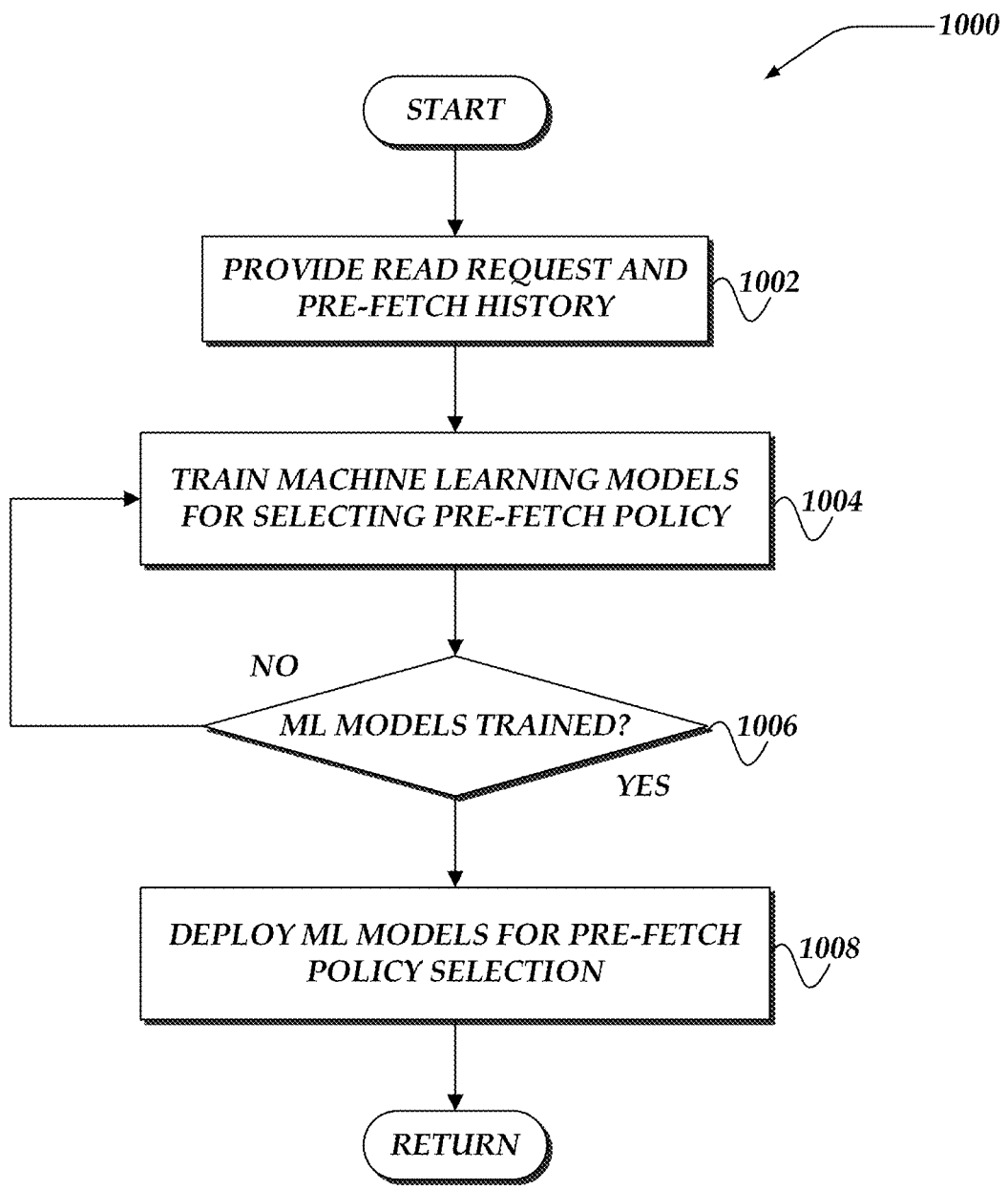
FIG. 10 illustrates a flowchart of a process for training machine learning models to select pre-fetch policies in accordance with one or more of the various embodiments.

FIG. 10 illustrates a flowchart of process 1000 for training machine learning models to select pre-fetch policies in accordance with one or more of the various embodiments. After a start flowchart block, at flowchart block 1002, in one or more of the various embodiments, read request history the corresponding pre-fetch records may be provided. In one or more of the various embodiments, the pre-fetch engine may be arranged to log or record read requests for a defined time period to collect data for training machine learning models that may be used for selecting a pre-fetch policy. In one or more of the various embodiments, the data may be captured during file system operations that may be considered to be similar to the file system operations that are expected to occur when selecting pre-fetch policies using the machine learning models.

In one or more of the various embodiments, the data may be captured from operations performed on one or more other file systems that may processed read requests that are similar to the file system where the machine learning models are expected to be used.

In one or more of the various embodiments, the captured read request data may be limited to values for input parameter vectors. Or, in some embodiments, the captured data may include raw log data, complete representations of the read requests (e.g., serialized data structures of the requests), hints, tags, additional metrics, or the like.

In one or more of the various embodiments, different machine learning model types may require or benefit from different training data. Accordingly, in some embodiments, the pre-fetch engine may be arranged to determine the particular data for collection based on configuration information provided by configuration files, plug-ins, file system policies, pre-fetch policies, built-in defaults, user input, or the like, combination thereof.

At flowchart block 1004, in one or more of the various embodiments, pre-fetch engines may instantiate one or more the machine learning engines to train one or more machine learning models for selecting pre-fetch policies based on the historical read request records or pre-fetch historical records. In one or more of the various embodiments, training may include providing simulated read requests that are associated with pre-fetch policy pairs from the training data to the machine learning engine to train classifiers. Training may include evaluating the simulated results of one or more pre-fetch policies as selected by one or more machine learning classifiers. Accordingly, in one or more of the various embodiments, pre-fetch policies selected by the classifiers may be evaluated using the historical data to simulate handling read requests for a read session.

Alternatively, in one or more of the various embodiments, the machine learning engine may be arranged to train machine learning models along-side or in parallel with the non-machine learning based methods described above. For example, a file system may be arranged to rely on heuristics, pattern matching, selection rules, or the like, to select pre-fetch policies until one or more classifiers are trained such that they provide results that exceed the heuristics, pattern matching, selection rules, or the like.

At flowchart decision block 1006, in one or more of the various embodiments, if the one or more machine learning models are trained, control may flow to block 1008; otherwise, control may loop back to block 1004. In one or more of the various embodiments, the machine learning engine may continue learning and evaluating until one or more models consistently select winning pre-fetch policies within a tolerance threshold.

At flowchart block 1008, in one or more of the various embodiments, the pre-fetch engine may be arranged to deploy the one or more machine learning models (e.g., classifiers, or he like) for pre-fetch policy selections. In one or more of the various embodiments, because the machine learning models have been trained to select optimal pre-fetch policies, they may be deployed for use by the pre-fetch engine. In one or more of the various embodiments, the pre-fetch engine may be arranged to continue evaluating the performance the selected pre-fetch policies as compared to the unselected pre-fetch policies. Accordingly, in one or more of the various embodiments, if the pre-fetch engine discovers that the pre-fetch policy selected by the one or more machine learning models is not optimal, the machine learning models may be pulled out of service and retrained.

Next, control may be returned to a calling process.

Figure 11:
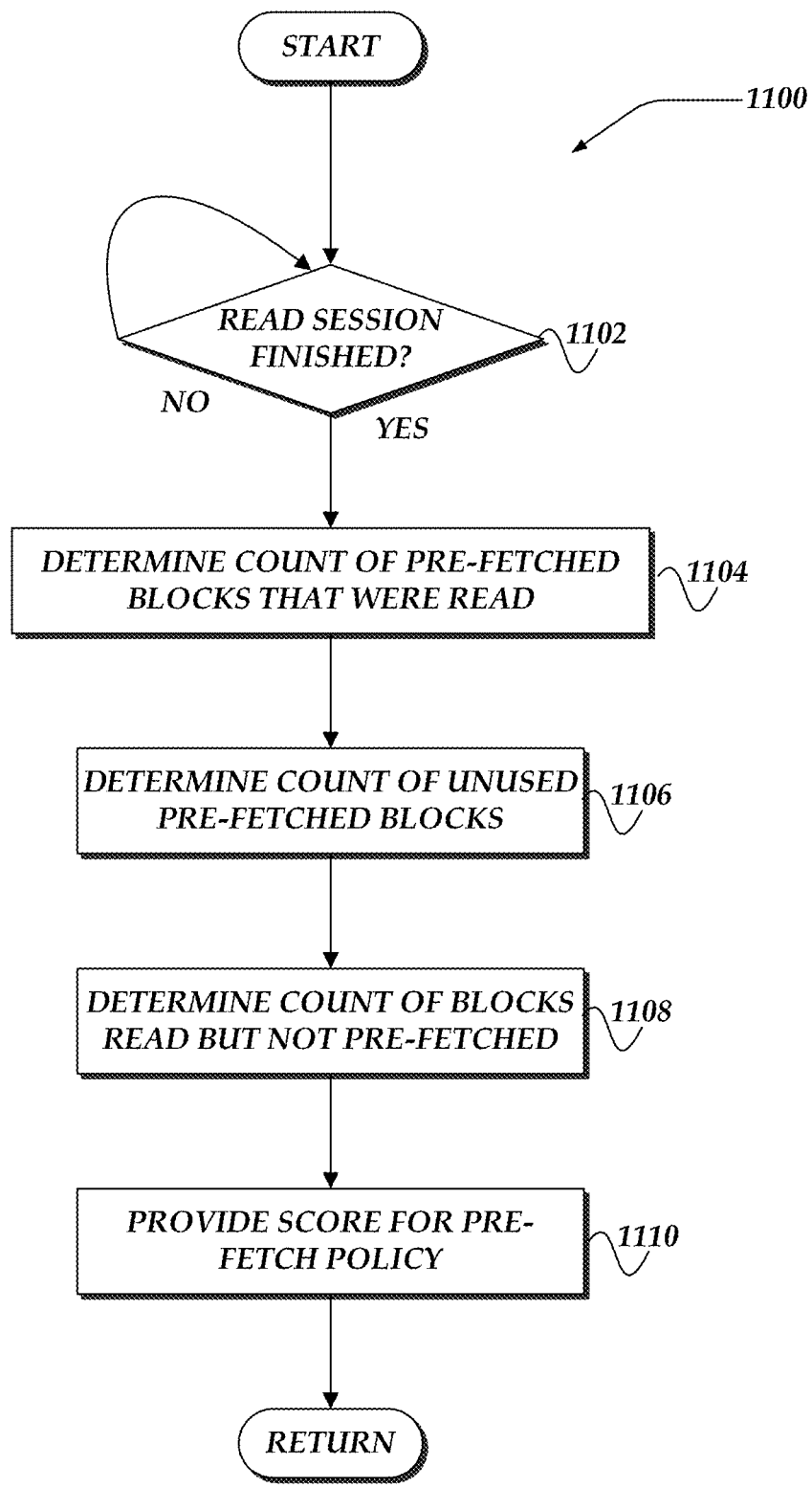
FIG. 11 illustrates a flowchart of a process for evaluating pre-fetch policies in accordance with one or more of the various embodiments.

FIG. 11 illustrates a flowchart of process 1100 for evaluating pre-fetch policies in accordance with one or more of the various embodiments. After a start flowchart block, at flowchart decision block 1102, in one or more of the various embodiments, if the read session is finished, control may be flow to flowchart block 1104. In one or more of the various embodiments, the pre-fetch engine may be arranged to define the boundaries of a read session using various criteria. In some embodiments, read session boundary criteria may be selected based on one or more of the factors employed to select a pre-fetch policy. In some embodiments, one or more pre-fetch policies may be associated with one or more rules the define a the boundaries of a read session in the context the pre-fetch policies.

In one or more of the various embodiments, the pre-fetch engine may be arranged to determine read session boundaries based on one or more characteristics of the read requests. In some embodiments, a read session may be considered finished if the delay between read requests provided from the same source exceeds a defined threshold value.

In one or more of the various embodiments, the file system engine may be arranged to provide tags or hints that may be employed to indicate the beginning or end of a read session. For example, in some embodiments, if a client is trying to read a higher level file system object, such as, a document, the client may provide several read requests to read all of the blocks that comprise the document. Accordingly, for example, file system engines may be arranged to provide information to the pre-fetch engine that indicate that read requests are associated with the same file system object (e.g., document, or the like).

In one or more of the various embodiments, the pre-fetch engine may be arranged to demark read sessions using time durations or expiry values. In one or more of the various embodiments, this may include setting a timer each time a new read request is observed and considering the session ended at the expiration of the timer. In this context, a new request may be identified using it request key or similar unique identifier. For example, in one or more of the various embodiments, if a new read request is observer, the pre-fetch engine may start a 5 second timer. Then if the timer expires, the pre-fetch engine may consider the read session finished for the purposes of scoring or evaluating the efficacy of one or more pre-fetch policies.

In one or more of the various embodiments, the one or more threshold values, condition values, rule parameters, or the like, employ to demark read sessions may be provided based on configuration information provided by configuration files, plug-ins, file system policies, pre-fetch policies, built-in defaults, user input, or the like, combination thereof.

At flowchart block 1104, in one or more of the various embodiments, the pre-fetch engine may be arranged to determine a count of the pre-fetched blocks that were read during the session. In one or more of the various embodiments, during the execution of the pre-fetch policy, the pre-fetch engine may be arranged to keep a record of the count of blocks that are pre-fetched and whether they are read by clients during the read session.

In one or more of the various embodiments, whether blocks read by clients have been pre-fetched or if the pre-fetched blocks have been read by clients during a session may be collected and stored in pre-fetch history of a pre-fetch policy. Note, in one or more of the various embodiments, this record keeping may be performed for the selected pre-fetch policy as well as the one or more pre-fetch policies that were not selected for a session.

Accordingly, in one or more of the various embodiments, the pre-fetch engine may be arranged to compare the blocks that were actually read by the client to the blocks that the selected pre-fetch policy pre-fetched. Also, in one or more of the various embodiments, the pre-fetch engine may be arranged to compare the blocks read by the client to the blocks that would have been pre-fetched by the unselected pre-fetch policies.

At flowchart block 1106, in one or more of the various embodiments, the pre-fetch engine may be arranged to determine a count of blocks that were pre-fetched and not read during the read session. In one or more of the various embodiments, pre-fetching blocks that are not read may unnecessarily consume resources, such as, pre-fetch storage space, processor resources, I/O resources, or the like. Accordingly, in one or more of the various embodiments, the pre-fetch engine may be arranged to consider such waste if evaluating the efficacy of one or more pre-fetch policies.

At flowchart block 1108, in one or more of the various embodiments, the pre-fetch engine may be arranged to determine a count of blocks that were read but not pre-fetched during the read session. In one or more of the various embodiments, if blocks read by a client have not been pre-fetched, the may be provided from file storage, or the like. In some embodiments, read blocks directly from file storage rather pre-fetch storage may introduce undesirable latency related to differences in storage device performance. Also, in one or more of the various embodiments, as mentioned above, some pre-fetch policies may be arranged to optimize the sort order or layout order of blocks stored on pre-fetch storage. Accordingly, in some embodiments, if blocks are read from file storage, performance improvements associated with an optimized layout of blocks on pre-fetch storage may be missed.

At flowchart block 1110, in one or more of the various embodiments, the pre-fetch engine may be arranged to provide one or more evaluation scores for the pre-fetch policy for the read session. In one or more of the various embodiments, each pre-fetch policy associated with a read request may be evaluated. This may include the selected pre-fetch policy that was used during the read session and the one or more pre-fetch policies that were not used. Evaluation data for the unselected one or more pre-fetch policies may be provided by effectively simulating how those pre-fetch policies would have performed. For example, given that the pre-fetch engine has a record of the read requests and blocks that may be associated with a read session, it may model how the unselected one or more pre-fetch policies would have performed to evaluate them.

In one or more of the various embodiments, the pre-fetch engine may be arranged to provide a score that represents a measure of the efficacy of each of the one or more pre-fetch policies that were available. In some embodiments, the formula for combining the various metrics associated with each pre-fetch policy into a score may vary depending on the operational considerations of the file system. In one or more of the various embodiments, the particular scoring method may be determined based on configuration information provided by configuration files, plug-ins, file system policies, pre-fetch policies, built-in defaults, user input, or the like, combination thereof. For example, in some embodiments, a score for each pre-fetch policy may be computed based on the number of blocks read from pre-fetch storage minus the number of blocks read from file storage minus the number of blocks pre-fetched but not read within a read session. In one or more of the various embodiments, other formulas may be used to emphasize performance factors that may of import given the operational considerations associated with the file system. For example, in some embodiments, pre-fetch storage may be a very scarce resource that is used for other important caching operations. Accordingly, in this example, a scoring formula that is targeted at minimizing waste (pre-fetching blocks that are not read) may be used.

Also, in one or more of the various embodiments, other metrics associated with the read session may be used for evaluating the performance of the one or more pre-fetch policies.

Next, control may be returned to a calling process.

It will be understood that each flowchart block of the flowchart illustrations, and combinations of flowchart blocks in the flowchart illustrations, can be implemented by computer program instructions. These program instructions may be provided to a processor to produce a machine, such that the instructions, which execute on the processor, create means for implementing the actions specified in the flowchart block or flowchart blocks. The computer program instructions may be executed by a processor to cause a series of operational steps to be performed by the processor to produce a computer-implemented process such that the instructions, which execute on the processor to provide steps for implementing the actions specified in the flowchart block or flowchart blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more flowchart blocks or combinations of flowchart blocks in the flowchart illustration may also be performed concurrently with other flowchart blocks or combinations of flowchart blocks, or even in a different sequence than illustrated without departing from the scope or spirit of the invention.

Accordingly, flowchart blocks of the flowchart illustration support combinations of means for performing the specified actions, combinations of steps for performing the specified actions and program instruction means for performing the specified actions. It will also be understood that each flowchart block of the flowchart illustration, and combinations of flowchart blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    instantiating a pre-fetch engine to perform actions including:
        receiving one or more read requests associated with the file system that includes a pre-fetch storage tier and a file storage tier of one or more storage devices;
        employing a pre-fetch policy selected from a plurality of pre-fetch policies to copy one or more blocks to the pre-fetch storage tier, wherein the selection of the pre-fetch policy is based on one or more characteristics of the one or more read requests, and wherein each pre-fetch policy includes instructions for copying one or more blocks on the file storage tier to the pre-fetch storage tier;
        evaluating a performance of the selected pre-fetch policy to fulfill one or more subsequent read requests and also evaluating a simulated performance of each unselected pre-fetch policy based on the one or more subsequent read requests;
        providing a performance score based on the evaluation of the selected pre-fetch policy and providing one or more other performance scores based on the simulated evaluation of each unselected pre-fetch policy; and
        when one of the other performance scores for one of the unselected pre-fetch policies exceeds the performance score of the selected pre-fetch policy, selecting the one of the unselected pre-fetch policies as a new selected pre-fetch policy for further one or more subsequent read requests, wherein the new selected pre-fetch policy improves efficiency and performance of the one or more processors by increasing an amount of the further one or more subsequent read requests being fulfilled by the one or more blocks copied to the pre-fetch storage tier.

2. The method of claim 1, wherein providing the performance score, further comprises:
    increasing the performance score based on a number of the one or more blocks that are read by the one or more subsequent read requests;
    decreasing the performance score based on a number of the one or more blocks that remain unread by the one or more subsequent read requests; and
    decreasing the performance score based on a number of one or more other blocks located on the file storage tier that are read by the one or more subsequent read requests, wherein the one or more other blocks are unselected by the selected pre-fetch policy.

3. The method of claim 1, wherein determining the selected pre-fetch policy, further comprises:
    instantiating a machine learning engine to perform actions including:
        generating one or more input parameters based on the one or more characteristics of the one or more read requests;
        providing the one or more input parameters to one or more machine learning models; and
        determining the selected pre-fetch policy based on one or more results from the one or more machine learning models.

4. The method of claim 1, wherein the selection of the pre-fetch policy is based on its association with a highest performance score that is associated with one or more previous read requests that are similar to the one or more read requests.

5. The method of claim 1, wherein the pre-fetch engine performs further actions including:
    storing one or more associations of performance scores and the one or more characteristics of the one or more read requests; and
    further determining the selected pre-fetch policy based on the one or more associations.

6. The method of claim 1, wherein determining the selected pre-fetch policy, further comprises, selecting a no-copy pre-fetch policy that refrains from copying any blocks to the pre-fetch storage tier to minimize waste based on a prediction that pre-fetching the one or more blocks is unnecessary to improve performance.

7. The method of claim 1, wherein the pre-fetch engine performs further actions, including:
    instantiating a machine learning engine to perform actions including:
        training one or more machine learning models based on one or more previous read requests and one or more previous performance scores, wherein the one or more machine learning models are trained to select the pre-fetch policy based on a first read request; and
        deploying the one or more trained machine learning models to select the pre-fetch policy based on the first read request.

8. The method of claim 1, wherein the one or more characteristics of the one or more read requests, includes, information that includes one or more of block identifiers, user information, directory or folder information, volume identifier, storage device type identifiers, application hints, filenames, file extensions, file size, time of day, file access properties, network addresses, or network ports.

9. A processor readable non-transitory storage media that includes instructions for managing data in a file system over a network, wherein execution of the instructions by one or more processors on one or more network computers performs actions, comprising:
    instantiating a pre-fetch engine to perform actions including:

receiving one or more read requests associated with the file system that includes a pre-fetch storage tier and a file storage tier of one or more storage devices;

employing a pre-fetch policy selected from a plurality of pre-fetch policies to copy one or more blocks to the pre-fetch storage tier, wherein the selection of the pre-fetch policy is based on one or more characteristics of the one or more read requests, and wherein each pre-fetch policy includes instructions for copying one or more blocks on the file storage tier to the pre-fetch storage tier;

evaluating a performance of the selected pre-fetch policy to fulfill one or more subsequent read requests and also evaluating a simulated performance of each unselected pre-fetch policy based on the one or more subsequent read requests;

providing a performance score based on the evaluation of the selected pre-fetch policy and providing one or more other performance scores based on the simulated evaluation of each unselected pre-fetch policy; and when one of the other performance scores for one of the unselected pre-fetch policies exceeds the performance score of the selected pre-fetch policy, selecting the one of the unselected pre-fetch policies as a new selected pre-fetch policy for further one or more subsequent read requests, wherein the new selected pre-fetch policy improves efficiency and performance of the one or more processors by increasing an amount of the further one or more subsequent read requests being fulfilled by the one or more blocks copied to the pre-fetch storage tier.

10. The media of claim 9, wherein providing the performance score, further comprises:

increasing the performance score based on a number of the one or more blocks that are read by the one or more subsequent read requests;

decreasing the performance score based on a number of the one or more blocks that remain unread by the one or more subsequent read requests; and decreasing the performance score based on a number of one or more other blocks located on the file storage tier that are read by the one or more subsequent read requests, wherein the one or more other blocks are unselected by the selected pre-fetch policy.

11. The media of claim 9, wherein determining the selected pre-fetch policy, further comprises:

instantiating a machine learning engine to perform actions including:

generating one or more input parameters based on the one or more characteristics of the one or more read requests;

providing the one or more input parameters to one or more machine learning models; and determining the selected pre-fetch policy based on one or more results from the one or more machine learning models.

12. The media of claim 9, wherein the selection of the pre-fetch policy is based on its association with a highest performance score that is associated with one or more previous read requests that are similar to the one or more read requests.

13. The media of claim 9, wherein the pre-fetch engine performs further actions including:

storing one or more associations of performance scores and the one or more characteristics of the one or more read requests; and further determining the selected pre-fetch policy based on the one or more associations.

14. The media of claim 9, wherein determining the selected pre-fetch policy, further comprises, selecting a no-copy pre-fetch policy that refrains from copying any blocks to the pre-fetch storage tier to minimize waste based on a prediction that pre-fetching the one or more blocks is unnecessary to improve performance.

15. The media of claim 9, wherein the pre-fetch engine performs further actions, including:

instantiating a machine learning engine to perform actions including:

training one or more machine learning models based on one or more previous read requests and one or more previous performance scores, wherein the one or more machine learning models are trained to select the pre-fetch policy based on a first read request; and deploying the one or more trained machine learning models to select the pre-fetch policy based on the first read request.

16. A system for managing data in a file system comprising:

a network computer, comprising:

a transceiver that communicates over the network;

a memory that stores at least instructions; and one or more processors that execute instructions that perform actions, including:

instantiating a pre-fetch engine to perform actions including:

receiving one or more read requests associated with the file system that includes a pre-fetch storage tier and a file storage tier of one or more storage devices;

employing a pre-fetch policy selected from a plurality of pre-fetch policies to copy one or more blocks to the pre-fetch storage tier, wherein the selection of the pre-fetch policy is based on one or more characteristics of the one or more read requests, and wherein each pre-fetch policy includes instructions for copying one or more blocks on the file storage tier to the pre-fetch storage tier;

evaluating a performance of the selected pre-fetch policy to fulfill one or more subsequent read requests and also evaluating a simulated performance of each unselected pre-fetch policy based on the one or more subsequent read requests;

providing a performance score based on the evaluation of the selected pre-fetch policy and providing one or more other performance scores based on the simulated evaluation of each unselected pre-fetch policy; and when one of the other performance scores for one of the unselected pre-fetch policies exceeds the performance score of the selected pre-fetch policy, selecting the one of the unselected pre-fetch policies as a new selected pre-fetch policy for further one or more subsequent read requests, wherein the new selected pre-fetch policy improves efficiency and performance of the one or more processors by increasing an amount of the further one or more subsequent read requests being fulfilled by the one or more blocks copied to the pre-fetch storage tier; and a client computer, comprising:

a transceiver that communicates over the network;

a memory that stores at least instructions; and
one or more processors that execute instructions that perform actions, including:
providing one or more of the one or more read requests.

17. The system of claim 16, wherein providing the performance score, further comprises:
increasing the performance score based on a number of the one or more blocks that are read by the one or more subsequent read requests;
decreasing the performance score based on a number of the one or more blocks that remain unread by the one or more subsequent read requests; and
decreasing the performance score based on a number of one or more other blocks located on the file storage tier that are read by the one or more subsequent read requests, wherein the one or more other blocks are unselected by the selected pre-fetch policy.

18. The system of claim 16, wherein determining the selected pre-fetch policy, further comprises:
instantiating a machine learning engine to perform actions including:
generating one or more input parameters based on the one or more characteristics of the one or more read requests;
providing the one or more input parameters to one or more machine learning models; and
determining the selected pre-fetch policy based on one or more results from the one or more machine learning models.

19. The system of claim 16, wherein the selection of the pre-fetch policy is based on its association with a highest performance score that is associated with one or more previous read requests that are similar to the one or more read requests.

20. The system of claim 16, wherein the pre-fetch engine performs further actions including:
storing one or more associations of performance scores and the one or more characteristics of the one or more read requests; and
further determining the selected pre-fetch policy based on the one or more associations.

21. The system of claim 16, wherein determining the selected pre-fetch policy, further comprises, selecting a no-copy pre-fetch policy that refrains from copying any blocks to the pre-fetch storage tier to minimize waste based on a prediction that pre-fetching the one or more blocks is unnecessary to improve performance.

22. The system of claim 16, wherein the pre-fetch engine performs further actions, including:
instantiating a machine learning engine to perform actions including:
training one or more machine learning models based on one or more previous read requests and one or more previous performance scores, wherein the one or more machine learning models are trained to select the pre-fetch policy based on a first read request; and
deploying the one or more trained machine learning models to select the pre-fetch policy based on the first read request.

23. The system of claim 16, wherein the one or more characteristics of the one or more read requests, includes, information that includes one or more of block identifiers, user information, directory or folder information, volume identifier, storage device type identifiers, application hints, filenames, file extensions, file size, time of day, file access properties, network addresses, or network ports.

24. A network computer for managing data in a file system, comprising:
a transceiver that communicates over the network;
a memory that stores at least instructions; and
one or more processors that execute instructions that perform actions, including:
instantiating a pre-fetch engine to perform actions including:
receiving one or more read requests associated with the file system that includes a pre-fetch storage tier and a file storage tier of one or more storage devices;
employing a pre-fetch policy selected from a plurality of pre-fetch policies to copy one or more blocks to the pre-fetch storage tier, wherein the selection of the pre-fetch policy is based on one or more characteristics of the one or more read requests, and wherein each pre-fetch policy includes instructions for copying one or more blocks on the file storage tier to the pre-fetch storage tier;
evaluating a performance of the selected pre-fetch policy to fulfill one or more subsequent read requests and also evaluating a simulated performance of each unselected pre-fetch policy based on the one or more subsequent read requests;
providing a performance score based on the evaluation of the selected pre-fetch policy and providing one or more other performance scores based on the simulated evaluation of each unselected pre-fetch policy; and
when one of the other performance scores for one of the unselected pre-fetch policies exceeds the performance score of the selected pre-fetch policy, selecting the one of the unselected pre-fetch policies as a new selected pre-fetch policy for further one or more subsequent read requests, wherein the new selected pre-fetch policy improves efficiency and performance of the one or more processors by increasing an amount of the further one or more subsequent read requests being fulfilled by the one or more blocks copied to the pre-fetch storage tier.

25. The network computer of claim 24, wherein providing the performance score, further comprises:
increasing the performance score based on a number of the one or more blocks that are read by the one or more subsequent read requests;
decreasing the performance score based on a number of the one or more blocks that remain unread by the one or more subsequent read requests; and
decreasing the performance score based on a number of one or more other blocks located on the file storage tier that are read by the one or more subsequent read requests, wherein the one or more other blocks are unselected by the selected pre-fetch policy.

26. The network computer of claim 24, wherein determining the selected pre-fetch policy, further comprises:
instantiating a machine learning engine to perform actions including:
generating one or more input parameters based on the one or more characteristics of the one or more read requests;
providing the one or more input parameters to one or more machine learning models; and
determining the selected pre-fetch policy based on one or more results from the one or more machine learning models.

27. The network computer of claim 24, wherein the selection of the pre-fetch policy is based on its association with a highest performance score that is associated with one or more previous read requests that are similar to the one or more read requests.

28. The network computer of claim 24, wherein the pre-fetch engine performs further actions including:
   storing one or more associations of performance scores and the one or more characteristics of the one or more read requests; and
   further determining the selected pre-fetch policy based on the one or more associations.

29. The method of claim 24, wherein determining the selected pre-fetch policy, further comprises, selecting a no-copy pre-fetch policy that refrains from copying any blocks to the pre-fetch storage tier to minimize waste based on a prediction that pre-fetching the one or more blocks is unnecessary to improve performance.

30. The network computer of claim 24, wherein the pre-fetch engine performs further actions, including:
   instantiating a machine learning engine to perform actions including:
      training one or more machine learning models based on one or more previous read requests and one or more previous performance scores, wherein the one or more machine learning models are trained to select the pre-fetch policy based on a first read request; and
      deploying the one or more trained machine learning models to select the pre-fetch policy based on the first read request.

* * * * *